United States Patent [19]

Regis

[11] 3,856,252

[45] Dec. 24, 1974

[54] TELESCOPIC SUPPORT FOR SEATS, TABLES AND THE LIKE

[75] Inventor: Rene Marc Jean Regis, Fontaines Saint Martin, France

[73] Assignee: Les Aplications Industrielles du Tube, Villeurbanne (Rhone), France

[22] Filed: Nov. 23, 1973

[21] Appl. No.: 418,771

[30] Foreign Application Priority Data

Nov. 29, 1972 France .............................. 72.43276

[52] U.S. Cl. ................. 248/402, 248/404, 108/147, 297/348
[51] Int. Cl. ..................... A45d 19/04, F16m 13/00
[58] Field of Search ........... 108/144, 147; 248/399, 248/401–403, 161, 162, 404, 157, 422, 248/188.5; 297/338, 339, 345, 347, 348

[56] References Cited
UNITED STATES PATENTS

| | | | |
|---|---|---|---|
| 208,823 | 10/1878 | Jennings | 248/422 X |
| 569,809 | 10/1896 | Burke | 248/404 |
| 1,044,523 | 11/1912 | Hedman | 248/402 X |
| 1,726,372 | 8/1929 | Stoll | 248/403 |
| 1,937,254 | 11/1933 | Stoll | 248/403 |
| 2,641,309 | 6/1953 | Bostrom et al. | 248/401 |
| 2,655,334 | 10/1953 | Debrie | 248/422 |
| 2,999,729 | 9/1961 | Semmelroth | 108/144 UX |

FOREIGN PATENTS OR APPLICATIONS

| | | | |
|---|---|---|---|
| 15,725 | 8/1905 | Great Britain | 248/404 |
| 363,136 | 7/1962 | Switzerland | 297/345 |
| 1,173,916 | 12/1969 | Great Britain | 248/402 |

*Primary Examiner*—James T. McCall
*Assistant Examiner*—Lawrence J. Staab
*Attorney, Agent, or Firm*—Karl F. Ross; Herbert Dubno

[57] ABSTRACT

A telescopic support for seats, tables and the like having an inner tube mounted in an outer fixed tube and vertically adjustable relative to the outer tube. The outer tube carries a rack which cooperates with a toothed wheel on the inner tube to facilitate vertical adjustment. A toothed shoe carried within the inner tube normally engages the toothed wheel to lock the wheel against rotation and thus prevent vertical movement of the inner tube relative to the outer tube. A control lever may be used to disengage the shoe from the wheel, but only when the seat, table or the like is unloaded. Thus a sudden drop of the seat, table or the like when in use is substantially eliminated.

4 Claims, 3 Drawing Figures

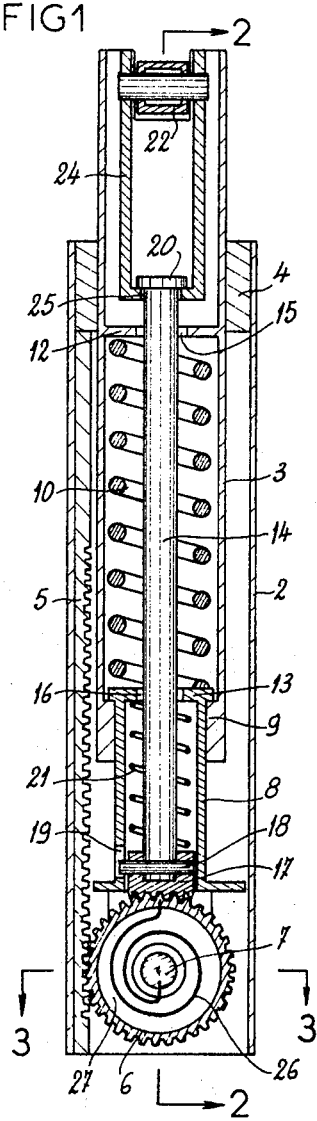
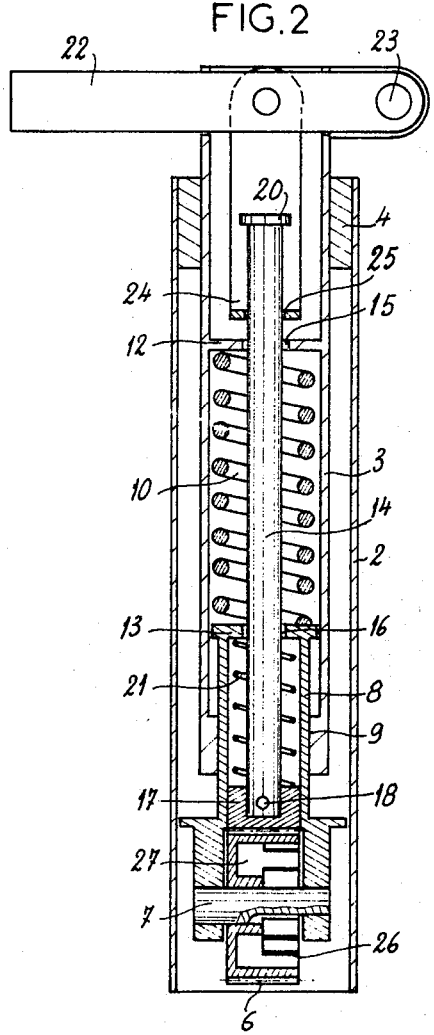
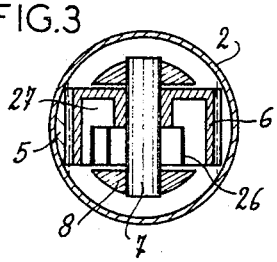

TELESCOPIC SUPPORT FOR SEATS, TABLES AND THE LIKE

The present invention relates to a telescopic support for seats, tables and the like.

Telescopic supports for seats, tables and the like are known, comprising a fixed outer tube, i.e. integral with the legs and an inner tube sliding axially inside the outer tube and provided with means for attaching the member for which the support is intended, a rack integral with one of the tubes along one of its generatrices, a toothed wheel mounted to rotate freely on a shaft supported transversely by the other tube, in order to mesh with the aforesaid rack and a toothed shoe capable of engaging in the teeth of the said toothed wheel to prevent it from rotating and with which are associated operating means making it possible to disengage it from these teeth.

These supports are frequently used in the construction of seats having an adjustable height. They are sometimes provided with a damping device allowing the seat to oscillate vertically which increases its comfort.

Despite the various improvements which may be applied thereto, these telescopic supports do not offer sufficient safety. Indeed, the member controlling the telescopic system, generally a lever, may unlock the seat at any time, whether the latter is empty or under load. Inopportune operation of this lever thus causes the sudden drop of the user. The same is true in the case of a table provided with a telescopic support of the aforesaid type.

It is the object of the present invention to remedy this drawback.

According to the invention, the rack is integral with the outer tube and the shaft of the toothed wheel is supported by a lower sliding extension of the inner tube, spring means normally keeping the inner tube and its extension in an extended position, whereas the means for operating the toothed shoe are constituted by a rod, to which it is attached at the lower end, which passes axially through the inner tube and its extension and whose upper end, provided with an enlarged head, is connected by means of a stirrup member to a control lever pivoted at a pivot integral with the inner tube and whose upwards movement causes the displacement in the same direction of the aforesaid rod, when the member supported by this support is not under load, but has no effect on this rod when, owing to the loading of this member, the inner tube has slid vertically downwards on its lower extension and on the rod.

Indeed, this sliding causes the lowering of the stirrup member by means of which the rod is connected to its control lever, such that its raising is insufficient to enable it to reach the level of the head of the rod. Consequently, when the member is loaded, disengagement of the toothed wheel for the purpose of adjusting the height is made impossible.

Spring means are advantageously provided which normally keep the toothed shoe supported by the rod in the lower position, i.e., engaged with the teeth of the toothed wheel. These means provide increased safety, since the toothed shoe bears against the teeth under an additional force.

According to a preferred embodiment of the invention, spring means are provided which are capable of urging the sliding extension of the inner tube upwards when the toothed wheel connected to the aforesaid extension is no longer prevented from rotating by the engagement of the toothed shoe in its teeth.

When the toothed wheel is disengaged, these spring means tend to move it upwards on the rack and thus to raise the entire attachment connected to the toothed wheel, including the inner tube and the member which is fixed thereto. If, for example, it is a seat, the user has no need to raise it when he wishes to increase the height: the seat rises itself.

In any case, the invention will be better understood by means of the following description, referring to the accompanying diagrammatic drawing, illustrating as a non-limiting example, one embodiment of this telescopic support:

FIG. 1 is a longitudinal sectional view thereof, the member supported by the support not being under load;

FIG. 2 is a longitudinal sectional view on line 2—2 of FIG. 1, the member supported by the support being under load;

FIG. 3 is a cross-sectional view on line 3—3 of FIG. 1.

In known manner, this telescopic support comprises a fixed outer vertical tube 2 and an inner tube 3 sliding axially inside the outer tube 2. The fixed outer tube 2 is integral with legs which are not shown in the drawing. At its upper end, the inner tube 3 is provided with means for attaching a member such as a seat or table which are not shown in the drawing.

The inner tube 3 slides freely in a bearing 4 integral with the upper part of the outer tube 2. It may also rotate freely in this bearing, which makes it possible to provide a revolving seat.

According to the invention, a rack 5 is placed inside the outer tube 2. It is fixed against the wall of this outer tube 2 along one of its generatrices. A toothed wheel 6 introduced inside the outer tube 2 meshes with the rack 5 such that the rotation of this wheel 6 is accompanied by a vertical movement.

The toothed wheel 6 is mounted to rotate freely on a shaft 7 integral with a tubular extension 8 of the inner tube 3. The tubular extension 8 slides in a bearing 9 of anti-friction material integral with the lower part of the inner tube 3.

Meshing of the toothed wheel 6 with the rack 5 prevents the sliding extension 8 from rotating with respect to the outer tube 2.

Spring means normally keep the arrangement constituted by the inner tube 3 and its sliding extension 8 in the extended position. In the example shown, these means are constituted by a helical spring 10 compressed between an abutment 12 integral with the inner tube 3 and an abutment 13 integral with the upper part of the sliding extension 8.

This abutment 13 also prevents the sliding extension 8 from separating from the inner tube 3.

Passing axially through the arrangement formed by the inner tube 3 and its sliding extension 8, is a rod 14 which passes through apertures 15 and 16 respectively provided in the abutments 12 and 13.

The lower end of the rod 14 has a toothed shoe 17. A cotter pin 18 integral with the shoe 17 is engaged in a vertical aperture 19 in the sliding extension 8 and allows the vertical rod 14 to move axially whilst retaining a given angular position.

The orientation and shape of the teeth of the shoe 17 enable it to engage in the teeth of the wheel 6 and thus to prevent it from rotating when the rod 14 is in its lower position.

The upper end of the rod 14 is provided with an enlarged head 20.

Spring means normally keep the shoe 17 in the lower position, i.e., engaged with the teeth of the toothed wheel 6. In the example shown, these means are constituted by a helical spring 21 compressed between the lower side of the abutment 12 and the upper side of the shoe 17.

A control lever 22 is pivoted at a pivot 23 integral with the upper part of the inner tube 3. A stirrup piece 24 introduced inside this tube 3 is pivoted to the lever 22 at its upper part. At its lower part it comprises a bore 25 through which the rod 14 passes. The enlarged head 20 of the rod 14 has a diameter such that it is unable to pass through the bore 25.

Finally, spring means are provided capable of urging the sliding extension 8 of the inner tube 3 upwards. These means may clearly act solely when the toothed wheel 6 connected to the sliding extension 8 has not been prevented from rotating by engagement of the toothed shoe 17 on its teeth.

In the example shown, these spring means are constituted by a spiral spring 26 placed in an annular housing 27 provided in the toothed wheel 6. One of the ends of the spiral spring 26 is fixed to the shaft 7 of the toothed wheel 6. The other end is attached at a point of this toothed wheel 6 located on the outer wall of the annular housing 27.

The adjustment of height takes place by moving the toothed wheel 6 along the rack 7. In the example shown, the toothed wheel 6 and consequently the member fixed to the top of the inner tube 3 are in the lower position.

The locking of this member at a predetermined level is produced by the engagement of the toothed shoe 17 in the teeth of the wheel 6.

For a given adjustment, the inner tube 3 may also occupy a variable position depending on the load which it supports. Thus, FIG. 1 shows the support when the member attached thereto is not under load and FIG. 2 shows the same support when the member is under load. Depending on the magnitude of the load, the helical spring 10 is compressed to a greater or lesser degree and the relative position of the inner tube 3 and the rod 14 varies.

It should be noted that the damping effect of the spring 10 is the same whatever the chosen adjustment point.

To vary the height, it is necessary to be able to disengage the toothed wheel 6 by acting on the rod 14.

When the member supported by the support is not under load, upwards movement of the lever 22 causes the displacement in the same direction of the stirrup member 24 and the rod 14, whose enlarged head 20 is raised by the lower part of the said stirrup member 24. The helical spring 21 is slightly compressed and the shoe 17 no longer immobilises the toothed wheel 6.

The spiral spring 26 tends to raise the entire attachment connected to the toothed wheel 6. The member fixed to the inner tube 3, a seat or the like, is thus raised if the user does not exert a downwardly directed force thereon.

Under the joint action of the weight of the various moving parts and the helical spring 21, the toothed shoe 17 once more engages with the toothed wheel 6 as soon as the lever 22 is no longer drawn upwards.

When the member fixed to the support is under load, the inner tube 3 slides downwards on its lower sliding extension 8 and on the rod 14; this sliding causes the lowering of the stirrup member 24 such that upwards movement of the lever 23 has no effect on the rod 14. In fact, although this operation causes raising of the stirrup member 24, the lower part of the latter does not reach the level of the enlarged head 20 of the rod 14.

Consequently, when the member is under load, the disengagement of the toothed wheel 6 for the purpose of adjusting the height is impossible. This feature ensures safety when the member is under load, particularly in the case of a seat where an inopportune operation of the lever 22 cannot cause the user to fall from the seat.

Naturally, the invention is not limited to the single embodiment of this telescopic support which has been described above as a non-limiting example; on the other hand, it includes all variations. In particular, it should be noted that the various tubes are not necessarily of circular section, but may also be polygonal and that the application to seats and tables is not limiting; the present invention may be applicable in all cases where a telescopic adjustment of two tubes with respect to each other is necessary.

I claim:

1. Telescopic support for members such as seats, tables and the like, of the type comprising a fixed outer tube, for attaching support legs, an inner tube sliding axially inside the outer tube attaching the member for which this support is intended, a rack integral with one of the tubes along one of its generatrices, a toothed wheel mounted to rotate freely on a shaft supported transversely by the other tube, in order to mesh with the aforesaid rack and a toothed shoe capable of engaging in the teeth of the aforesaid toothed wheel in order to prevent it from rotating and with which are associated operating means making it possible to disengage it from these teeth, characterised in that the rack is integral with the outer tube and the shaft of the toothed wheel is supported by a lower sliding extension of the inner tube, spring means normally keeping the inner tube and its extension in the extended position, whereas means for operating the toothed shoe are constituted by a rod to which the toothed shoe is attached at the lower end, which passes axially through the inner tube and its extension and whose upper end, provided with an enlarged head, is slidably connected by means of a stirrup member to a control lever pivoted at a pivot integral with the inner tube upward movement of the control lever causing the displacement in the same direction of the aforesaid rod, when the member supported by this support is not under load, but having no action on this rod when, owing to the loading of this member, the inner tube has slid downwards on its lower extension and on the rod.

2. Telescopic support for members such as seats, tables and the like according to claim 1, characterised in that spring means are provided keeping the toothed shoe supported by the rod in the lower position, i.e. engaged on the teeth of the toothed wheel.

3. Telescopic support for members such as seats, tables and the like according to claim 1, characterised in that spring means are provided capable of urging the sliding extension of the inner tube upwards when the toothed wheel connected to the aforesaid extension is not prevented from rotating by engagement of the toothed shoe in its teeth.

4. Telescopic support for members such as seats, tables and the like, according to claim 3, characterised in that the spring means capable of urging the sliding extension of the inner tube upwards are constituted by a spiral spring placed in an annular housing provided in the toothed wheel and having one of its ends fixed to the shaft of said wheel and its other end fixed at a point of said wheel.

* * * * *